3,065,139
ANTI-INFECTANT TOPICAL PREPARATIONS
Sten Yngve Ericsson, Stockholm, and Lars Erik Stjernström, Solna, Sweden, assignors to Aktiebolaget Astra, Apolekarnes Kemiska Fabriker, Sodertalje, Sweden
No Drawing. Filed Nov. 9, 1954, Ser. No. 467,876
Claims priority, application Sweden Nov. 12, 1953
7 Claims. (Cl. 167—72)

The present invention relates to anti-infectant preparations. An object thereof is to provide anti-infectants which are effective against as many noxious microorganisms, such as bacteria and viruses, as possible without being toxic to the human or animal body. It is also an object that the anti-infectant shall act very rapidly.

The inventors have found that such an anti-infectant can be obtained by establishing a reduction-oxidation (i.e. a redox) system containing (1) an oxidizing agent, and (2) as reducing component at least one compound containing an enediol group (—COH:COH—), and (3) also a catalyst for the reduction-oxidation reaction. The anti-infectant or antimicrobial effect of this combination of substances apparently is due to a disintegration of various high-molecular weight substances in the microorganisms, such as certain enzymes, substances of toxin nature and polysaccharides.

Extensive investigations in vitro have indicated that the enediol-compound ascorbic acid is most effective for the present purpose, combined, of course, with the appropriate proportions of oxidizer and catalyst to be explained in more detail hereinbelow.

Since, according to the inventors' experience, it is the enediol-group that provides the basis for the activity of their anti-infectant, ascorbic acid as the compound containing this group is useful for the purpose, although alkali metal salts thereof may be employed with advantage.

In point of principle, as oxidizer component of the redox system, there is included a percarbonate, and an alkali metal, particularly a sodium percarbonate, being preferred. For obtaining the optimum antimicrobial action, the oxidizer and enediol-compound should be present in equivalent proportions, but in practice considerable deviations from this ratio may take place.

As catalyst for the redox reaction, copper has been found exceedingly effective. Other heavy metals have a more or less similar effectiveness, and particularly the metals of atomic numbers 25 to 30, inclusive, in the periodic system of elements, i.e. Cu, Fe, Mn, Ni, and Co, come into consideration.

With ascorbic acid an antimicrobial effect was found down to about 0.0001-molar concentration and, a strong effectiveness was found at about 0.002-molar concentration and thereabove of the enediol-compound and the oxidizer. With regard to the catalyst a clear effectiveness was found with 0.00001 percent by weight of copper sulphate and the effectiveness was strong in concentrations far below the toxic limit for the most sensitive animal tissues, e.g. tissue cultures of parenchyma. In the final solution to be applied to the microorganisms the concentration of copper ions should, therefore, be chosen within the limits 0.000004 and 0.0004 percent by weight.

In view of the low concentrations of oxidizer and catalyst necessary for full antimicrobial effectiveness as well as of the harmlessness of the enediol-compounds, the present anti-infectants are practically non-toxic.

In concentrations considerably higher than those contemplated for the present invention, some enediol-compounds have a certain antimicrobial effect per se and peroxides also exert a certain antimicrobial activity per se, particularly if combined with catalytically acting copper ions. With all species of bacteria hitherto tested the inventors have found, however, that, in equivalent concentrations, their anti-infectant system consisting of an enediol-compound, a peroxide and a slight proportion of cupric ions surpasses peroxide alone, even if catalyzed by cupric ions, by nearly 100 times with regard to antimicrobial effectiveness. The inventors have also tested enediol-compounds combined either with peroxide alone or alone with a salt yielding copper ions, but the effectiveness of such combinations was only about one tenth of that of the complete system of enediol, oxidizer and catalyst.

A bactericidal or virucidal effect, respectively, of the enediol-oxidation catalyzed by copper ions has been demonstrated against all bacteria and viruses hitherto tested. A strong effect has been obtained with many species which are highly resistant to previously known chemotherapeutically and antimicrobially active agents, for instance *Bacillus proteus*, *Pseudomonas pyocyanea*, *Candida albicans*, and poliomyelitis virus. A strong bactericidal effect has also been found with streptococci ($\alpha$, $\beta$, enterococci), pneumococci (I) *Escherichia coli*, *Salmonella typhimurium*, *Corinebacterium diphtheriae*, *Hemophilus pertussis*, and others. Against *Mycobacterium tuberculosis* the enediol oxidation has had only a weak bactericidal effect.

The antimicrobial action has been found to be very rapid, the concentrations detailed above being valid for a reaction time of only 5 minutes. The rate of the reaction between enediol and oxidizer decreases gradually with time, and no further effect on the test bacteria has been demonstrated after one hour. While this is a limitation of the described method in some cases, it is an advantage in others. No variation of the effect with pH value has been demonstrated within the physiologically important range pH 5 to 8, not has any difference in action between room temperature and body temperature been found.

Clinically, the enediol oxidation has so far been tested most extensively in cases of stomatitis and gingivitis. The results have been clearly positive, and in many cases striking. A strong reduction of the oral bacterial flora can easily be demonstrated by a single one-minute rinse with a solution of 0.02-M ascorbate, containing at the same time the appropriate concentrations of the oxidizer and copper ions.

The antimicrobial effect of the enediol oxidation is strongly supported in many fluids by the simultaneous depolymerization of polysaccharides, which is a side effect of the reaction. This depolymerization is especially valid for protein-bound polysaccharides which have been shown to protect the microbes against both ordinary antiseptics and the normal defense mechanisms of the animal body. A consequence of the depolymerization through the enediol oxidation is a rapid reduction of the viscosity of several polysaccharide-containing body secretions, which enhances the effectiveness of these anti-infectants as they thus have power to make their own path to the seat of the microbes.

Since it is the actual oxidation process of the enediol which exerts the antimicrobial action, the reacting components must not be brought together in water solution until the time of application, or immediately before this application. They can, however, be mixed in the form of water-free powders, tablets, or pastes. In the case of mixing two or all of the components in powder or tablet form, the slow reaction taking place in the solid state can be blocked by granulating the particles and coating them with a stabilizing agent such as sodium silicate. Pasty preparations may with advantage be made up with water-free glycerol as paste base. For keeping the ingredients separated during storing it is also possible to distribute them in a water-free vehicle such as paraffin oil or olive oil or, if desired, water-free glycerol. On the occasion of application the mixture is dissolved or suspended in water, which is preferably weakly alkaline in case the vehicle is an oil. In an aqueous solution of, for example, the oxidizer and traces of a copper salt, the decomposition of the oxidizer can also be prevented by the addition of sodium silicate. The presence of the silicate has not been found to exert any influence on the antimicrobial action of the reaction between enediol, the oxidizer, and the metal ions.

In view of the fact that the activity of the present anti-infectants depends upon the redox reaction which takes place within a short time after mixing the ingredients in the presence of water, a practical way is to store the ingredients separately, in dry state or in aqueous solution, and apply them to the seat of infection immediately upon mixing them. Possibly the catalyst could be stored in admixture with either the enediol-compound or the oxidizer or both, preferably, however, not with the enediol. Obviously, the ingredients of the present anti-infectants may be proportioned according to the particular uses they may be intended for.

The mixtures of enediols and oxidizers in proportions useful for the present invention may automatically attain an appropriate pH, preferably between 5 and 8, but should a correction thereof be desired an alkaline substance such as sodium hydroxide or sodium carbonate, or an acid substance, such as citric acid, compatible with the body, may be added. If the enediol and the oxidizer are stored separately, the alkaline substance may be added to the enediol and the acid substance to the percarbonate, if desired, until neutral reaction.

In case the ingredients are stored in two separate individually stable aqueous solutions, they can be applied simultaneously by using a spray flask or an atomizer having two separate chambers, one for each of the solutions.

A clinically useful solution may at the moment of application contain, for instance, 0.01–0.04 molar ascorbic acid or sodium ascorbate, 0.1–0.5 percent by weight of sodium percarbonate, and about 0.0008 percent by weight of $CuSO_4$.

Since the molecular weight of ascorbic acid is 176.12, then 0.01–0.04 molar ascorbic acid of the preceding paragraph is equivalent to 1.76 to 7.04 grams of ascorbic acid per liter. Similarly, as the molecular weight of sodium ascorbate is 198, then 0.01 to 0.04 molar sodium ascorbate amounts to 1.98 to 7.92 grams of sodium ascorbate per liter. Then also, about 0.00008 percent by weight of $CuSO_4$ of the preceding paragraph amounts to about 0.008 part of copper sulfate per liter.

What is claimed is:

1. An anti-infectant preparation comprising (a) at least one member of the class consisting of ascorbic acid and an alkali metal ascorbate; (b) an alkali metal percarbonate as an oxidizing agent; and (c) as a catalyst for the oxidation of the constituent (a) a minor amount, in relation to the amount of either of the constituents (a) and (b), of a water-soluble salt of copper, which salt is ionizable in water to yield ions of said metal; and in which preparation, in its form before it is to be used, any aqueous phase present contacts only one of the members of the class consisting of the constituents (a) and (b).

2. A preparation as claimed in claim 1, in which the water-soluble copper salt is present in a proportion of from three hundred-thousandths to one one-hundreth of a mole of copper per mole of the member of the class consisting of ascorbic acid and an alkali metal ascorbate.

3. A preparation as claimed in claim 1, wherein each of the ingredients (a), (b) and (c) is kept out of contact with each of the other two of them before the preparation is to be used.

4. A preparation as claimed in claim 1, which is free of free moisture.

5. A preparation as claimed in claim 4, which is prepared in a dosage form selected from the class consisting of powder mixtures, tablets, and non-aqueous pastes.

6. An anti-infectant preparation comprising ascorbic acid, sodium percarbonate and copper sulfate, in the proportions of from 1.76 to 7.04 parts of ascorbic acid to from one to five parts of sodium percarbonate to about 0.008 part of copper sulfate.

7. A preparation as claimed in claim 6, wherein the ascorbic acid is replaced by from 1.98 to 7.92 parts of sodium ascorbate.

References Cited in the file of this patent

UNITED STATES PATENTS 975,354     Gruter     Nov. 6, 1910

OTHER REFERENCES

Lwoff et al.: Annales le Institut Pasteur, volume 68 (1942), pages 323 to 342.

Rosenberg: Chemistry and Physiology of Vitamins, 1942, New York Interscience Publishers, page 329.

UNITED STATES PATENT OFFICE
CERTIFICATE OF CORRECTION

Patent No. 3,065,139            November 20, 1962

Sten Yngve Ericsson et al.

It is hereby certified that error appears in the above numbered patent requiring correction and that the said Letters Patent should read as corrected below.

In the grant, lines 3 and 12, and in the heading to the printed specification, line 5, for "Apolekarnes", each occurrence, read -- Apotekarnes --; column 1, line 53, for "concentration and," read -- concentration, and --; column 2, line 35, for "not" read -- nor --; column 3, line 47, for "0.00008" read -- 0.0008 --.

Signed and sealed this 8th day of October 1963.

(SEAL)
Attest:

ERNEST W. SWIDER
Attesting Officer

EDWIN L. REYNOLDS
Acting Commissioner of Patents